(12) United States Patent
Little et al.

(10) Patent No.: US 11,104,090 B2
(45) Date of Patent: Aug. 31, 2021

(54) CONTROL SYSTEM FOR TIRE INJECTION FILLING MIXING MACHINE

(71) Applicant: CARLISLE CONSTRUCTION MATERIALS, LLC, Carlisle, PA (US)

(72) Inventors: Jeff Little, Rossville, GA (US); John Bishop, DuBois, PA (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 0 days.

(21) Appl. No.: 16/990,750

(22) Filed: Aug. 11, 2020

(65) Prior Publication Data

US 2021/0078271 A1  Mar. 18, 2021

Related U.S. Application Data

(60) Provisional application No. 62/899,318, filed on Sep. 12, 2019.

(51) Int. Cl.
*B29D 30/04* (2006.01)
*B29D 30/06* (2006.01)
(Continued)

(52) U.S. Cl.
CPC .......... *B29D 30/04* (2013.01); *B29C 45/0001* (2013.01); *B29C 45/7686* (2013.01); *B29D 30/0678* (2013.01); *B29K 2075/00* (2013.01)

(58) Field of Classification Search
CPC .... B29D 30/04; B29D 30/0678; B29D 30/02; B29D 30/0685; B29D 2030/0634; B29D 2030/0637; B29D 2030/0638; B29D 2030/0665; B29D 2030/0066; B29D 2030/0698; B29D 2030/201; B29D 2030/0635; B29D 2030/0636; B29C 45/0001; B29C 45/7686; B29K 2075/00; B60C 19/12
(Continued)

(56) References Cited

U.S. PATENT DOCUMENTS

| | | | | |
|---|---|---|---|---|
| 4,506,982 A | * | 3/1985 | Smithers | B01F 7/00641 366/142 |
| 2002/0020351 A1 | * | 2/2002 | Shaffer | B60C 7/102 118/683 |

(Continued)

*Primary Examiner* — Katelyn W Smith
*Assistant Examiner* — Sedef E Paquette
(74) *Attorney, Agent, or Firm* — David R. Heckadon; Gordon Rees Scully Mansukhani LLP

(57) ABSTRACT

A method of controlling operation of a tire filling mixing machine, by: (a) mixing a rubber/polyurethane and a catalyst in a first mixer to form a virgin polyurethane; (b) grinding cured polyurethane core bits in a grinder; (c) mixing the virgin material and the ground material in a second mixer thereby forming a mixed flatproofing material; (d) injecting the mixed flatproofing material into a tire; (e) measuring the ratio of ground material to virgin material in the mixed flatproofing material; (f) comparing the measured ratio of ground material to virgin material to a pre-stored preferred ratio of ground material to virgin material; and (g) increasing or decreasing the relative percentages of virgin material and ground material entering the second mixer by an amount that is a fraction of the difference between the measured ratio and the pre-stored preferred ratio.

9 Claims, 9 Drawing Sheets

(51) Int. Cl.
*B29K 75/00* (2006.01)
*B29C 45/00* (2006.01)
*B29C 45/76* (2006.01)

(58) Field of Classification Search
USPC ........................................ 156/112, 115, 404
See application file for complete search history.

(56) References Cited

U.S. PATENT DOCUMENTS

| 2004/0154718 | A1* | 8/2004 | Doesburg | ............... | B29D 30/04 |
| | | | | | 152/310 |
| 2005/0008727 | A1* | 1/2005 | Danules | .................. | B29C 44/02 |
| | | | | | 425/4 R |
| 2020/0254651 | A1* | 8/2020 | Tournebize | ........... | B29B 15/023 |

* cited by examiner

CONTROL SYSTEM FOR TIRE INJECTION FILLING MIXING MACHINE

RELATED APPLICATION

The present application claims priority to U.S. Provisional Patent Application Ser. 62/899,318, of same title, filed Sep. 12, 2019, the entire disclosure of which is incorporated herein by reference in its entirety for all purposes.

TECHNICAL FIELD

The present invention relates in general to equipment for flatproofing tires by injecting a mixed flatproof material into the tires, and in particular to control systems for such equipment.

BACKGROUND OF THE INVENTION

The Applicants previously developed novel systems for mixing materials to form a flatproofing material that was injected into tires. Examples of these novel systems are set forth in U.S. Pat. Nos. 6,988,524 and 6,918,979, incorporated herein by reference. In these systems, the machine first grinds used tire pieces and then mixes these ground tire pieces together with a liquid virgin rubber material (such as polyurethane) to form a flatproofing mixture. This flatproofing mixture is then injected into the core of a tire through an attached injector. The flatproofed tire is then allowed to cure (typically for 24 hours) such that the flatproofing mixture solidifies in the tire and then tire is then ready for use.

Ensuring that the desired ratio of ground material to virgin material is met (and remains constant over time) is not easy. This is due to factors such as normal wear and tear on system parts, back pressures arising from the grinding process and inconsistencies in the materials themselves. Another problem is that customers (i.e.: system operators) typically want to use high percentages of recycled materials (to decrease their own costs and increase recycling). Unfortunately, if the percentage of ground rubber/polyurethane is too high in the mixture, it may result in a weakened final product. In addition, the use of too high a percentage of ground rubber/polyurethane can also cause excessive wear and tear on the system's equipment, which may require the early replacement of worn out parts.

A customer operating the mixing system will typically ask for a preferred ratio of ground rubber in the final mixture (e.g.: 65% or 60%). Accordingly, a control system is therefore desired that will provide continuous adjustment to equipment parameters such that the actual ratio of ground rubber/polyurethane will be kept close to this preferred ratio over time (e.g.: from 64.5% to 65.5% for a desired ratio of 65%). As will be explained, the present system performs this function.

Prior to the development of the present control system, the ratio of ground material to virgin material was manually adjusted by varying the injector auger speed. However, this required previous measurements to be made of the system's output using scales and timers' gears and speeds. A problem that occurred was that should a pump or the injector start to perform outside of expected ranges, the ratio of the mixture of ground material to virgin material may start to vary unexpectedly. What is instead desired is an automatic control system that can step in and make corrections to the mixture ratio during partial failure of the pumps or injector. As will be shown, the present system can perform such automatic control (to adjust the mixture ratio) should the pumps or injector begin to fail or otherwise move outside of standard operating ranges. This has the advantage of permitting system operators to intervene and perform preventative repair prior to system failure and non-conforming product being pumped and lost operating time. In addition, unacceptable adjustments to the pump or injector speeds pump speeds can be detected and used to trigger system shutdown before failure of the pump and non-conforming material being produced.

What is presently desired (and provided by the present system) is an advanced control system for automatically adjusting the ratio of the ground rubber/polyurethane material to virgin rubber/polyurethane material that is injected into the tire. Preferably, the present control/adjustment system will adjust the ratio after each tire has been filled. Most preferably, the present control system will make the ratio adjustments automatically with minimum operator intervention. Importantly as well, however, is that the present control system makes these adjustments without overshooting or overcompensating such that the system is not continuously re-adjusting its ratios.

SUMMARY OF THE INVENTION

In accordance with the present invention, a control system is provided for controlling operation of a tire filling mixing machine. In preferred aspects, the control system operates by: (a) mixing a polyurethane isocyanate and a catalyst in equal parts in a first mixer to form a virgin polyurethane; (b) grinding cured polyurethane core bits in a grinder; (c) mixing the virgin polyurethane and the ground polyurethane core bits in a second mixer and injector combination thereby forming a mixed flatproofing material; (d) injecting the mixed flatproofing material into a tire; (e) measuring the ratio of ground cured polyurethane core bits to virgin rubber in the mixed flatproofing material; (f) comparing the measured ratio of ground polyurethane core bits to virgin polyurethane to a pre-stored preferred ratio of ground polyurethane to virgin polyurethane; and then (g) increasing or decreasing the relative percentages of virgin polyurethane and ground polyurethane core bits entering the second mixer by an amount that is a fraction of the difference between the measured ratio and the pre-stored preferred ratio.

It is to be understood that "a cured polyurethane core bit" as used herein is understood to refer to herein any of a cured virgin polyurethane, a cured virgin polyurethane and a used polyurethane either in chunks or in granules, a cured virgin polyurethane blended with crumb rubber particles, or a blend of any of these.

In preferred aspects, the present control system automatically adjusts the mixing ratio such that the measured ratio will be moved into a preferred band or range around the preferred ratio. For example, should the preferred ratio be 65% ground material, the present system may provide continual automatic adjustment to move the measured ratio into a band of between 64.5% to 65.5%. Note: It is to be understood that these percentage values are merely exemplary and that other values may be selected depending upon particular customer/operator desires.

In preferred aspects, the mixing ratio is measured after each tire is filled and the mixing ratio is adjusted slowly such that it moves into the acceptable band or range over a period of time. An advantage of moving somewhat slowly into the preferred band or range is that the system does not overshoot or overcompensate, or end up in a cycle of continuously adjusting and changing its values.

In optional preferred aspects, the fraction of the difference between the measured ratio and the pre-stored preferred ratio is ½% (i.e.: 1.005 or 0.9995). As such, control of the mixing ratio is adjusted by ½% (i.e.: adjusted up by 1.005 or down by 0.9995) whenever the measured ratio is outside of the acceptable band or range around the desired ratio.

Preferably, this adjustment (i.e.: moving towards the preferred ratio range) is performed by increasing or decreasing the speed of the auger. As such, should the measured ratio fall below the lower level of the acceptable band or range around the desired ratio, then the speed of the auger is increased by ½% (i.e. multiplied by 1.005). Conversely, should the measured ratio exceed the upper level of the acceptable band or range around the desired ratio, then the speed of the auger is decreased ½% (i.e. multiplied by 0.995). This higher ratio can be moved back into a normal range much more quickly such as 3 to 5% or multipliers of 0.97 and 0.95 respectively since a ratio higher than nominal can have many damaging effects on the process and machinery such as higher pressures and heavy torque requirements as well as producing non-conforming material that may fail prematurely.

The Applicant has tested and experimentally verified the present mixing re-adjusted control system approach. Selecting the preferred amounts that the mixing ratio is adjusted involved considerable testing and reevaluation.

In addition, the present inventors have experimentally determined that the measured ratio will typically move into the preferred range within about 20 (or often less) adjustments being made to the auger speed. In other words, after 20 tires (or fewer) have been filled, the ratio of the relative percentages of virgin material and ground material in the mixture will fall into a band or range around the desired or ideal ratio as selected by the customer/operator.

The choice of this preferred (½%) fraction is not obvious but instead has been experimentally determined by the present inventors to be a suitable time period over which to re-adjust the relative ratios of the ground material to virgin materials in the mixture. On one hand, the faster the adjustment is made from the measured ratio to the optimal (i.e.: desired) ratio, the better. The advantage of quick adjustment is that it reaches the optimal mixture most cost effectively. However, such rapid adjustment must be balanced against the possibility of the system's adjustment overshooting or over-correcting. Specifically, it is not desired for the ratios to swing wildly from one tire to the next. Although ½% is a preferred fraction, it is to be understood that fractions within the range of ¼% to 5.0% are all beneficial and are all contemplated as being covered within the scope of the present system.

In preferred aspects, the ratio of ground material to virgin material in the mixed flatproofing material is measured by scales (i.e.: weighing the inputs of the ground to virgin material). In preferred aspects, the increasing or decreasing of the relative percentages of virgin material and ground material entering the second mixer is performed by increasing or decreasing the speed of the injector auger.

In further aspects, the preferred control system method also prevents rapid over-adjusting or over-compensating of the relative ratio of ground material to virgin material. This is preferably done by not adjusting the mixture ratios if the measured ratio is different from the desired ratio by more than a pre-determined error percentage. In these various aspects, this pre-determined error percentage may be set at 7% or 8%. In other words, should the measured ratio be more than 7% away from the desired ratio, that particular measurement will be disregarded. The advantage of this approach of the invention is that it omits data outliers from its continual adjustment process. Note: It is to be understood that the choice of 7% is non-limiting and that other values could instead be selected. Moreover, the pre-determined error percentage at which outliers are ignored may be set at a different percentage away from the desired ratio, or be set at discrete numbers above and below the preferred or ideal ratio. For example, should the desired percentage be 65%, the system may be set to ignore any measured readings above 70% or below 50%. It is again to be understood that these values are non-limiting and that other values may be selected for the operators/customers of the system.

The present inventors have experimentally determined that a continual slow movement to the preferred range of optimum or desired mixture is performed best by a system that rejects outlier readings (e.g.: readings deviating too far from the desired ratio). If such outliers were not rejected, the swings in adjustment to the desired ratio would be much greater, and it may take much longer for the system to stabilize around a preferred ratio value. By avoiding the use of such outliers, the present system instead moves in a more predictable pace and manner towards the ideal or desired ratio.

In further preferred aspects, the present method comprises recording the measured data into a programmable logic controller. Optionally, this data may comprise: (a) the measured ratio and the time at which the measured ratio was taken, (b) the pre-stored preferred ratio (i.e. the desired ratio), and (c) the speed of the auger and the time at which the speed of the auger was measured. This data can then be transferred from the programmable logic controller to a remote system operator. The data can be transferred by wireless modem, Bluetooth connection, Ethernet wired connection, cellphone, etc. The advantage of recording and transmitting this data to a remote operator is that the remote operator can then identify and diagnose system problems such that adjustments and maintenance can be performed during normal system down time. In addition, this information can be used for verification (i.e.: to show that each tire meets requirements), for quality control (and to reinforce training) and to provide continuous improvement.

Reports can be made on material deliveries, the number of tires filled and the breakdown of material used over time.

In other preferred aspects, the present system may also measure the ratio of isocyanate to catalyst in the first mixer, compare this measured ratio to a pre-stored desired ratio, and then provide continuous adjustment to adjust the isocyanate to catalyst ratio in the mixer (similar to how the ground material to virgin material amounts are adjusted in the second mixer).

Table 1 shows two cases of test results in which the present control system moves the mixture into its preferred ratio range within 19 passes (i.e.: 19 tires filled) (Case 1), and within 16 passes (i.e.: 16 tires filled) (Case 2).

DETAILED DESCRIPTION OF THE FIGURES

Figure 1:
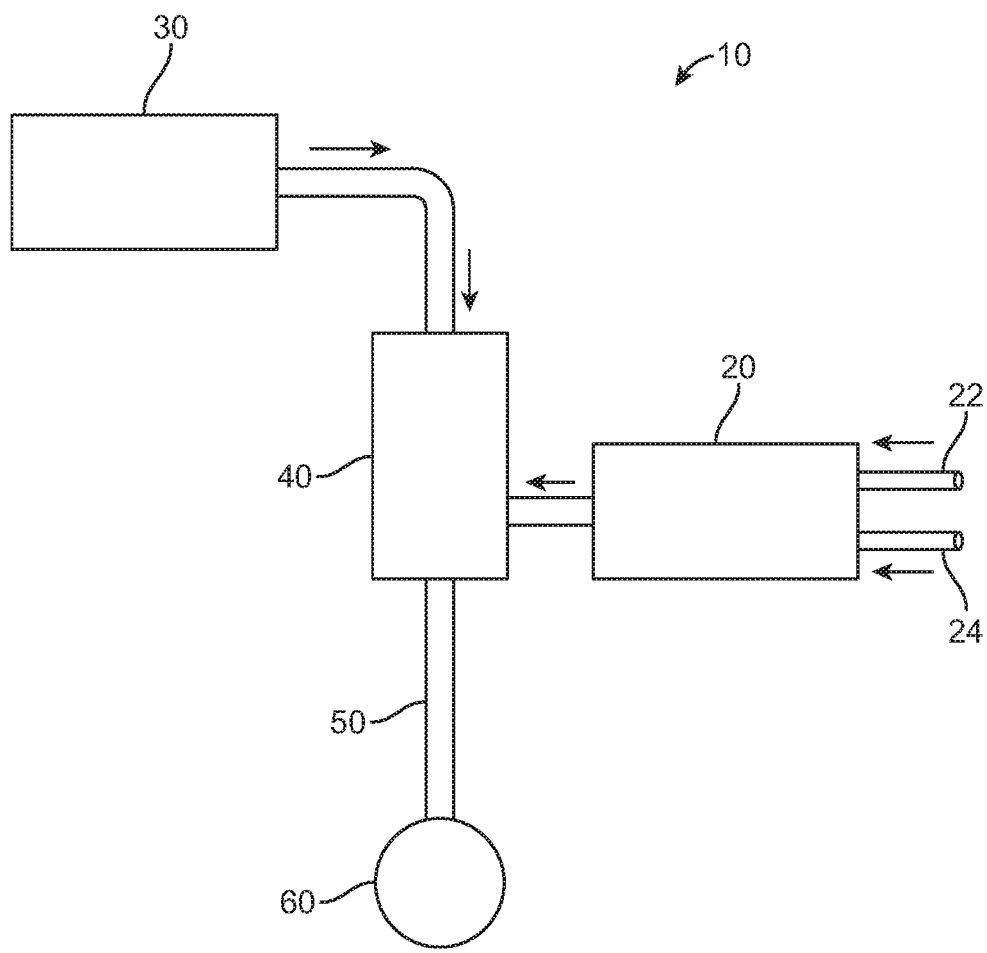
FIG. 1 is a flow schematic of the present system, explaining its operation.
Figure 2A:
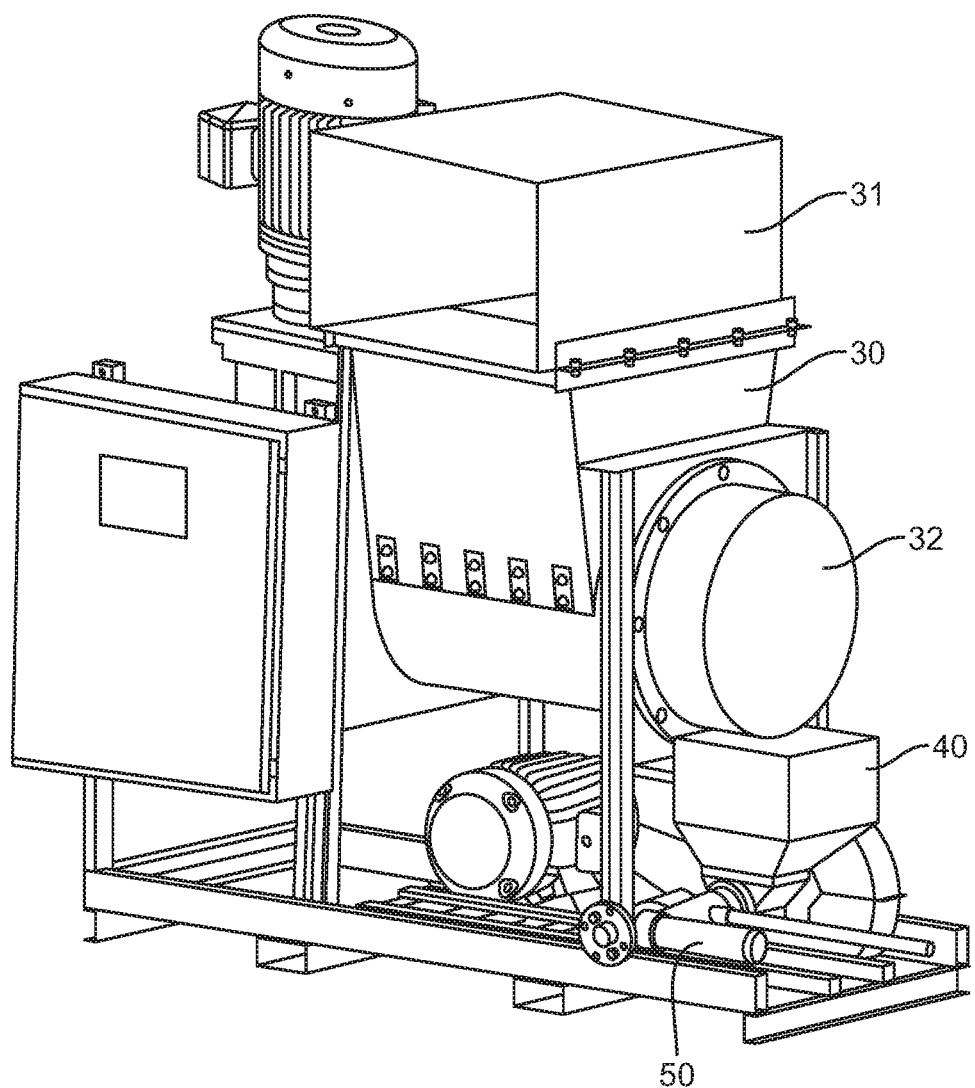
FIG. 2A is a perspective view of the present system.
Figure 2B:
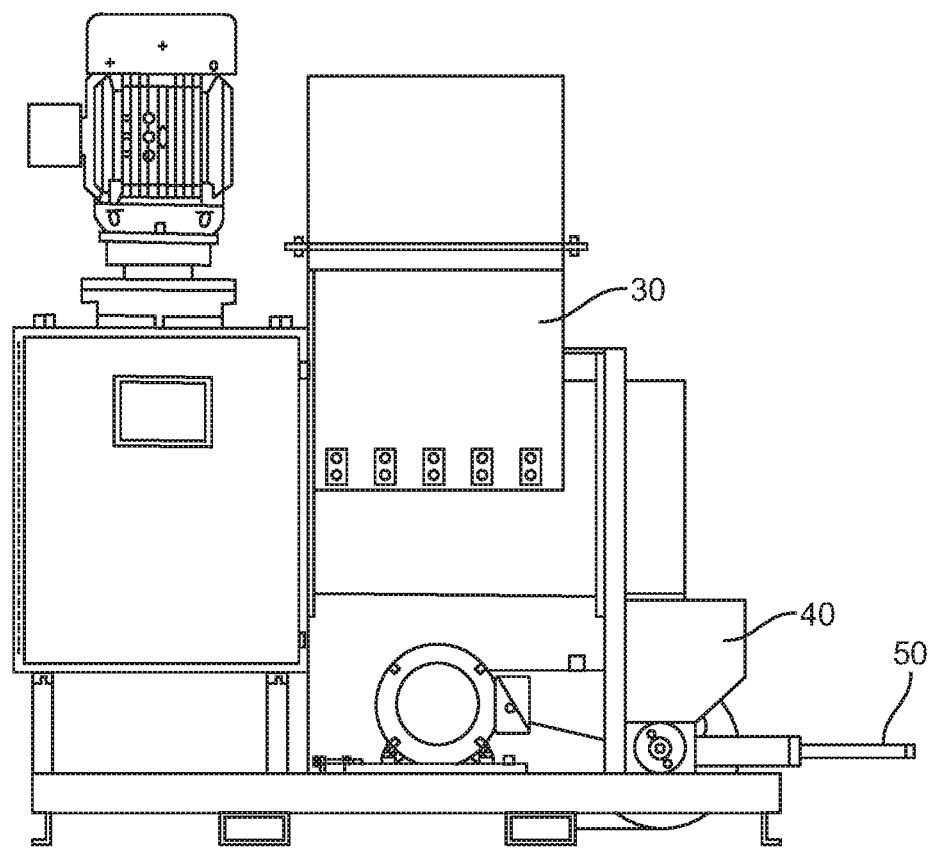
FIG. 2B is a side elevation view of the present system.
Figure 2C:
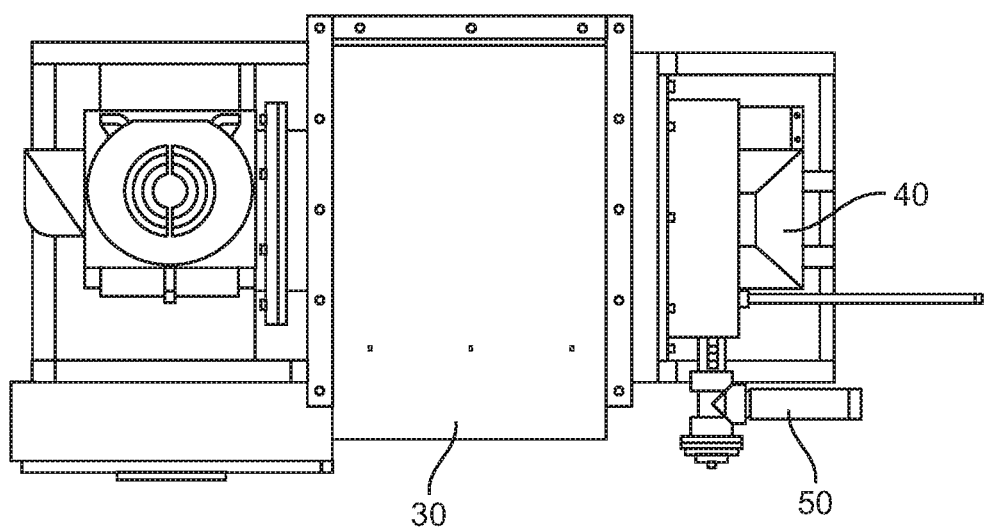
FIG. 2C is a top plan view of the present system.
Figure 2D:
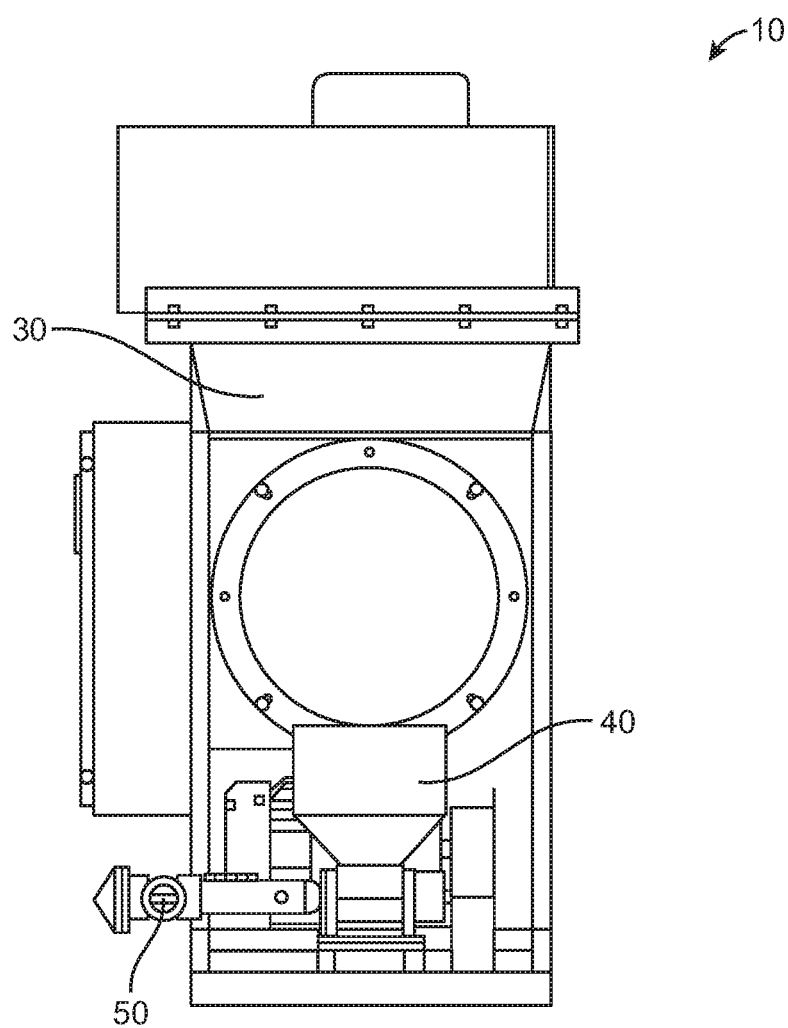
FIG. 2D is a front elevation view of the present system.

FIG. 1 is a flow schematic of the present system, explaining its operation, as follows. Tire filling system 10 comprises a first mixer 20 which receives a polyurethane into an inlet 22 and a catalyst into inlet 24. First mixer 20 mixes the polyurethane and catalyst to form a virgin polyurethane.

A grinder 30 grinds cured polyurethane core bits therein. These core bits preferably come from pre-used tires, and can optionally be any of a cured virgin polyurethane, a cured virgin polyurethane and a used polyurethane either in chunks or in granules, a cured virgin polyurethane blended with crumb rubber particles, or a blend of any of these materials. An auger 32 (FIGS. 3A and 3B) is disposed within grinder 30 for grinding the core bits down to a preferred small size. In preferred aspects, the ground core bits may have a diameter of ½ inch or less. This small dimension can be achieved by passing the ground core bits through the auger 32 and then passing through a screen having ½ inch holes. In preferred aspects, grinder 30 has an upper hopper 31 into which large pieces of rubber are inserted.

The ground rubber core bits from grinder 30 and the virgin polyurethane from first mixer 20 are then mixed together in second mixer 40 to form a tire flatproofing material that is then passed through an injector 50 into a tire 60. Tire 60 may be either a tubed or tubeless tire. Injector 50 may be a screw-type injector. A pump will also accompany injector 50.

FIGS. 2A to 2D illustrate further views of the present system 10 in which a control system and method of controlling operation of tire filling mixing machine 10 is provided. This method first comprises: (a) mixing the isocyanate and catalyst in first mixer 20 to form a virgin polyurethane; (b) grinding core bits in grinder 20; (c) mixing the virgin material and the ground core bits in second mixer 40 thereby forming a mixed flatproofing material; (d) injecting the mixed flatproofing material into tire 60.

Control of this method is provided by: (e) measuring the ratio of ground core bits to virgin polyurethane in the mixed flatproofing material; (f) comparing the measured ratio of ground material to virgin material to a pre-stored preferred ratio of ground material to virgin material; and (g) increasing or decreasing the relative percentages of virgin material and ground material entering the second mixer by an amount that is a fraction of the difference between the measured ratio and the pre-stored preferred ratio.

Specifically, scales are preferably provided to measure the ratio of ground material to virgin material in the mixed flatproofing material coming out of second mixer 40 (i.e.: by measuring the weight of ground rubber/polyurethane bits entering the second mixer 40 and by measuring the weight of virgin rubber/polyurethane entering the second mixer 40).

The mixing ratio measurements are preferably taken after each tire is filled. Next, as stated above, the relative percentages of virgin material and ground material entering second mixer 40 are adjusted by an amount that is a fraction of the difference between the measured ratio and the pre-stored preferred ratio. In optional embodiments, the fraction is ½%. As such, after perhaps 20 tires (or less) have been filed, the measured ratio will fall within a preferred range of virgin material to ground material. It is to be understood, however, that the fraction need not be ½% and may instead range from ¼% to 5%.

In preferred aspects, the ratio of ground to virgin material is 65% to 60% ground material to virgin material; however, this desired ratio may vary depending upon the ambient temperature and humidity where the tire filling and curing is carried out.

In preferred embodiments, increasing or decreasing the relative percentages of virgin material and ground material entering second mixer 40 is performed by increasing or decreasing the speed of auger 32 in grinder 30. In this regard, the speed of auger 32 is preferably adjusted by ½% (or by some other suitable amount or within some other suitable range).

In further preferred aspects, the present system automatically avoids over-compensating by not performing adjustments when the measured ratio is determined to be an outlier (which is likely the result of a data read error). Specifically, should the measured ratio deviate from the desired ratio by more than a certain percentage (or be above or below pre-determined values), then that particular reading is ignored and not acted upon. In preferred aspects, the relative percentages of virgin material and ground material entering the second mixer are not increased or decreased if the measured ratio of ground material to virgin material varies from the pre-stored preferred ratio by more than this pre-determined error percentage. In optional preferred aspects, the pre-determined error percentage is around 7% or 8%, or the desired mixture band or range may be set between 64.5% to 65.5% (for a desired 65% ratio), or between 59.5% to 60.5% (for a desired 60% ratio). The present approach of rejecting outliers ensures that the present system does not make large adjustments as a result of data errors. This prevents the present system from over-compensating or over-adjusting.

In further aspects of the present system, data is recorded into a programmable logic controller. Such data may include: (a) the measured ratio and the time at which the measured ratio was taken, (b) the pre-stored preferred ratio, and (c) the speed of the auger and the time at which the speed of the auger was measured. This data can be transmitted from the programmable logic controller to a remote system operator so that the operator can verify that the tires meet desired requirements and track and predict material usage and ordering. In preferred aspects, the operator can gain access to the control system through a NVC App or a web address. The present system may optionally scan barcodes to track material shipments.

Figure 3A:
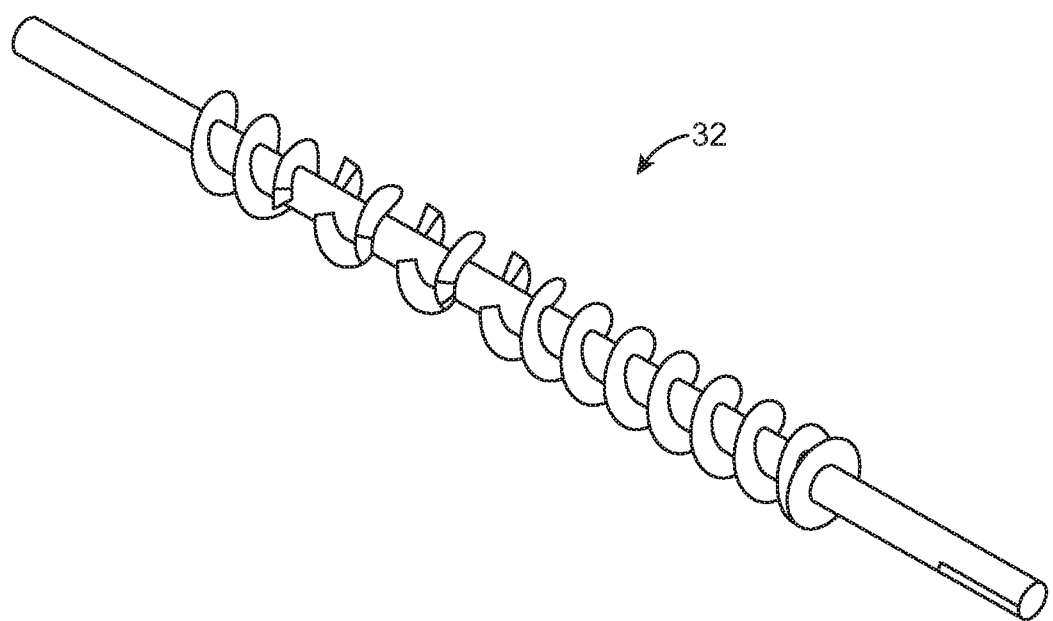
FIG. 3A is an illustration of an exemplary auger for use with the present system.
Figure 3B:
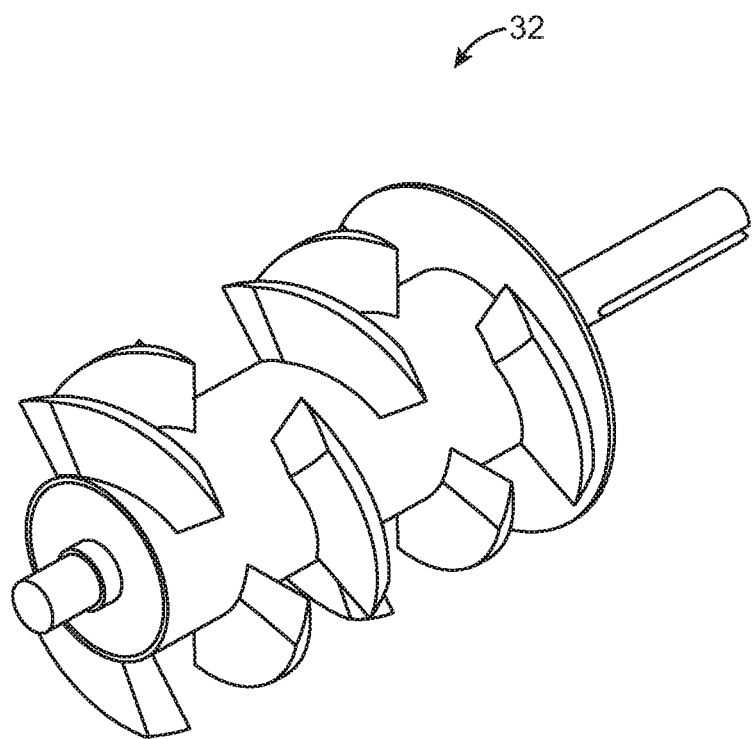
FIG. 3B is a close-up illustration of the exemplary auger of FIG. 3A (showing further details of the auger).

FIGS. 3A and 3B are illustrations of an exemplary auger for use with the present system.

In preferred aspects, sensors measure the temperature and vibration of the auger. In addition, sensors (such as an ultrasound sensor) can be added to the hopper 31 to detect the level of rubber crumb in the hopper. Should the level drop too low, the sensor(s) can be used to automatically shut down the system operation. This has the beneficial effect of preventing virgin material from being wasted when the recycled rubber crumb supply drops in the machine. Since rubber crumb is loaded into hopper 31 in bulk lots, this also ensures that the ratio of ground material to virgin material remains consistent.

Figure 4A:
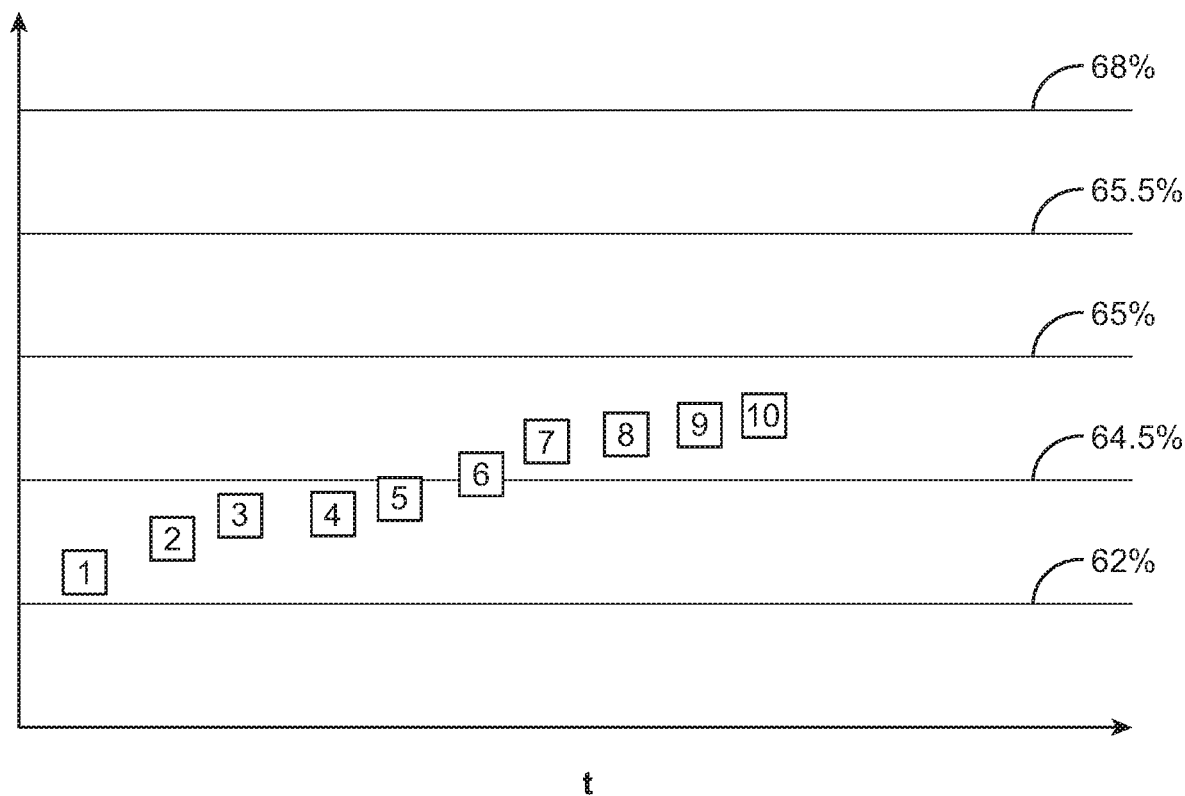
FIG. 4A is a first data plot of the adjustments made by the present control system to the ground rubber to virgin rubber mixture to a preferred ratio. Specifically, this data plot shows the changes in the percent of ground rubber in the mixture over time.
Figure 4B:
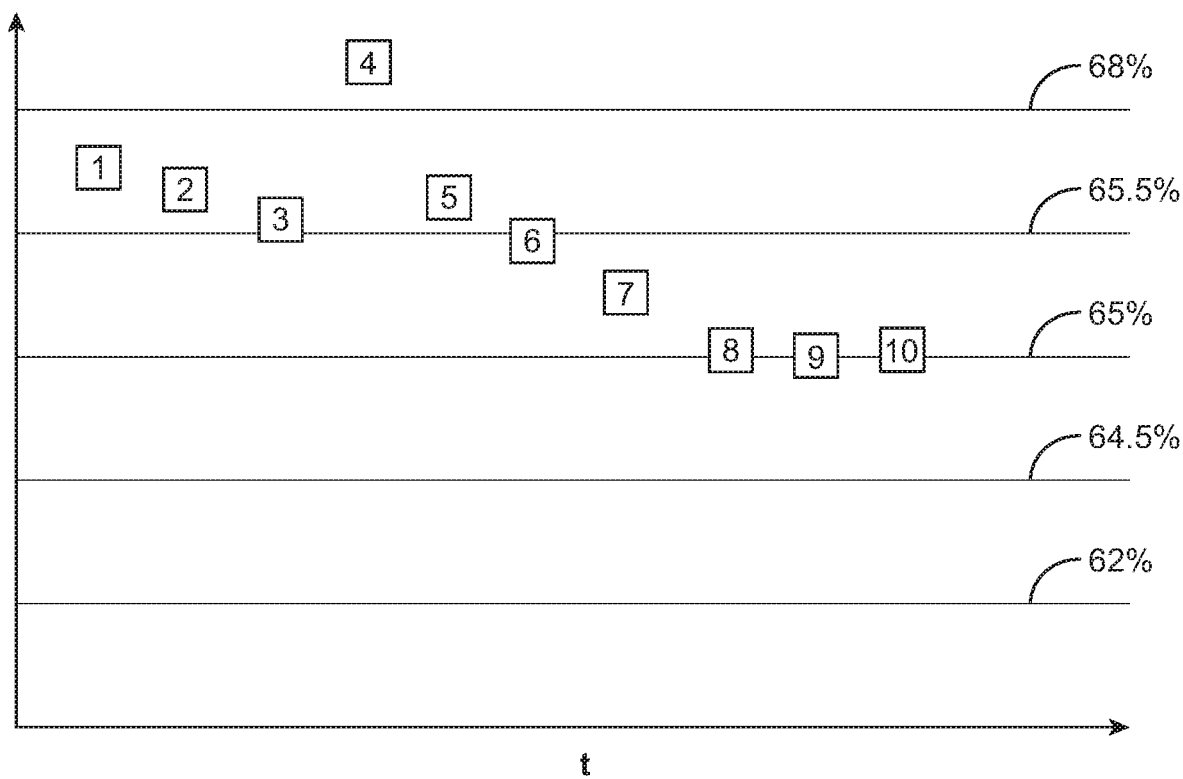
FIG. 4B is a second data plot of the adjustments made by the present control system to the ground rubber to virgin rubber mixture to a preferred ratio. This data plot also shows the changes in the percent of ground rubber in the mixture over time.

FIGS. 4A and 4B are illustrations two different cases of the present control system adjusting the ground rubber to virgin mixture to within a preferred range or band of the preferred ratio, as follows. For a target value of 65%, a desirable range is set into the present control system of from 64.5% to 65.5%. As such, production within this range (64.5% to 65.5%) is deemed to be acceptable and desired. Outlier reject values of 62% and 68% are also pre-set into the present control system. As such, should a measured value fall below 62% or above 68%, it is simply ignored.

In FIG. 4A, the operator/customer desires that 65% of the mixture is ground rubber. A first measurement [1] is taken after a first tire is filled. Since measurement [1] falls above 62%, adjustment is made to the mixture (e.g.: by increasing the auger speed by 1.005 times). A second measurement [2] is taken after the second tire is filled. Measurement [2] is closer to the preferred (i.e.: 64.5% to 65.5%) range and again the auger speed will be increased by 1.005 times. This pattern is repeated after each of tires [3], [4], [5] and [6]. Eventually, at measurement [7] (i.e.: after the 7$^{th}$ tire has been filled, no further adjustments are necessary. Instead, measurements are simply taken after each of tires [8], [9] and [10] to ensure the measured values are still within the acceptable ranges.

Another example is illustrated in FIG. 4B. A first measurement [1] is taken after a first tire is filled. Since measurement [1] falls above 65.5%, adjustment is made to the mixture (e.g.: by decreasing the auger speed by 0.995 times). A second measurement [2] is taken after the second tire is filled. Measurement [2] is closer to the preferred range (i.e.: 64.5% to 65.5%) and again the auger speed will be decreased by 0.995 times. This pattern is repeated after measurement [3] is taken. Next, however, an anomalous result [4] is measured. Since measurement [4] is above outlier limit 68%, it is simply ignored, and no action is taken. Next, measurements [5] and [6] are taken with adjustments being made to the mixture after each measurement. Eventually, at measurement [7] (i.e.: after the 7$^{th}$ tire has been filled, no further adjustments are necessary. Instead, measurements are simply taken after each of tires [8], [9] and [10] to ensure the measured values are still within the acceptable ranges.

It is to be understood that the values in FIGS. 4A and 4B are merely example values to illustrate the present inventive concepts. Different percentage values may be used for the desired mixture percentage, and for the acceptable band or range (around the desired mixture percentage) in which no corrective adjustment are taken. In addition, different percentage values may be used for the outlier values (above which and below which the measured ratio data is simply ignored). In the regions between the outlier values and the preferred range, the system continuously and automatically adjusts the mixture to slowly move it into the preferred range.

Table 1 shows two cases of experimental test results in which the control system moves the mixture into its preferred ratio range within 19 passes (i.e.: 19 tires filled) (Case 1), and within 16 passes (i.e.: 16 tires filled) (Case 2). The numbers in Table 1 do not correspond to those in FIGS. 4A and 4B since 4A and 4B only show a theoretical overview of two cases of system operation.

Lastly, the present system also optionally measures the ratio of rubber/polyurethane to catalyst in the first mixer 10 as well. This measured ratio is then compared to a pre-stored desired ratio, with the present control system provide continuous adjustment to adjust the rubber to catalyst ratio in the mixer (similar to how the ground rubber to virgin rubber amounts are adjusted in the second mixer).

TABLE 1

New ratio

| | | |
|---|---|---|
| Pounds per minute | 50 | |
| Desired ratio | 0.65 | |
| Calculated liquid | 17.5 | |
| Calculated crumb | 32.5 | |
| Pounds per minute | 45.5 | |
| Calculated ratio | 0.61538462 | |
| Measured liquid | 17.5 | |
| Measured crumb | 28 | |

| | 1.01 multiplier | | | 1.02 multiplier<br>If ratio <= 64.5 AND >= 58%, then<br>multiply injector rate by 1.01 (1.0%) | | | 1.03 multiplier | |
|---|---|---|---|---|---|---|---|---|
| Pass 1 | 28.28 | 45.78 | 0.617737 | 28.56 | 46.06 | 0.62006079 | 28.84 | 46.34 | 0.6223565 |
| Pass 2 | 28.5628 | 46.0628 | 0.62008389 | 29.1312 | 46.6312 | 0.62471478 | 29.7052 | 47.2052 | 0.62927813 |
| Pass 3 | 28.848428 | 46.348428 | 0.62242517 | 29.713824 | 47.213824 | 0.62934585 | 30.596356 | 48.096356 | 0.63614707 |
| Pass 4 | 29.1369123 | 46.6369123 | 0.62476075 | 30.3081005 | 47.8081005 | 0.63395325 | 31.5142467 | 49.0142467 | 0.64296095 |
| Pass 5 | 29.4282814 | 46.9282814 | 0.62709054 | 30.9142625 | 48.4142625 | 0.63853627 | 32.4596741 | 49.9596741 | 0.64971749 |
| Pass 6 | 29.7225642 | 47.2225642 | 0.62941445 | 31.5325477 | 49.0325477 | 0.64309421 | 33.4334643 | 50.9334643 | 0.6564145 |
| Pass 7 | 30.0197899 | 47.5197899 | 0.63173238 | 32.1631987 | 49.6631987 | 0.6476264 | | | |
| Pass 8 | 30.3199878 | 47.8199878 | 0.63404424 | 32.8064627 | 50.3064627 | 0.65213217 | | | |
| Pass 9 | 30.6231876 | 48.1231876 | 0.63634994 | 33.4625919 | 50.9625919 | 0.65661087 | | | |
| Pass 10 | 30.9294195 | 48.4294195 | 0.6386494 | 34.1318438 | 51.6318438 | 0.66106188 | 1.04 multiplier-overshoot-unusable | | |
| Pass 11 | 31.2387137 | 48.7387137 | 0.64094251 | 34.8144806 | 52.3144806 | 0.66548459 | 29.4 | 46.9 | 0.62686567 |
| Pass 12 | 31.5511008 | 49.0511008 | 0.64322921 | | | | 30.87 | 48.37 | 0.6382055 |
| Pass 13 | 31.8666119 | 49.3666119 | 0.6455094 | Enters lower deadband here | | | 32.4135 | 49.9135 | 0.64939345 |
| Pass 14 | 32.185278 | 49.685278 | 0.64778299 | | | | 34.034175 | 51.534175 | 0.66041952 |
| Pass 15 | 32.5071308 | 50.0071308 | 0.65004991 | | | | 35.7358838 | 53.2358838 | 0.67127436 |
| Pass 16 | 32.8322021 | 50.3322021 | 0.65231007 | | | | | | |
| Pass 17 | 33.1605241 | 50.6605241 | 0.65456338 | | | | | | |
| Pass 18 | 33.4921293 | 50.9921293 | 0.65680978 | | | | | | |
| | 1.04 multiplier | | | | | | | | |
| | 29.12 | 42.62 | 0.6246246 | | | | | | |
| | 30.2848 | 47.7848 | 0.6337748 | | | | | | |
| | 31.496192 | 48.996192 | 0.6428294 | | | | | | |

TABLE 1-continued

| | | New ratio | | | |
|---|---|---|---|---|---|
| 32.75604 | 50.25604 | 0.6517831 | | | |
| 34.066281 | 51.566281 | 0.6606309 | | | |
| Pounds per minute | 55.5 | | | | |
| Calculated ratio | 0.68468468 | | | | |
| Measured liquid | 17.5 | | | | |
| Measured crumb | 38 | | | | |
| | | | If ratio >= 65.5 AND <= 72.5, then multiply | | |
| | | .99 multiplier | injector rate by .99 (1.0%) | | |
| Pass 1 | 37.62 | 55.12 | 0.68251089 | 36.86 | 54.36 | 0.67807211 |
| Pass 2 | 37.2438 | 54.7438 | 0.6803291 | 35.7542 | 53.2542 | 0.67138742 |
| Pass 3 | 36.871362 | 54.371362 | 0.67813939 | 34.681574 | 52.181574 | 0.66463258 |
| Pass 4 | 36.5026484 | 54.0026484 | 0.67594182 | 33.6411268 | 51.1411268 | 0.65780965 |
| Pass 5 | 36.1376219 | 53.6376219 | 0.67373647 | 32.631893 | 50.131893 | 0.65092082 |
| Pass 6 | 35.7762457 | 53.2762457 | 0.6715234 | | | |
| Pass 7 | 35.4184832 | 52.9184832 | 0.66930269 | | | |
| Pass 8 | 35.0642984 | 52.5642984 | 0.66707441 | | | |
| Pass 9 | 34.7136554 | 52.2136554 | 0.66483864 | | | |
| Pass 10 | 34.3665189 | 51.8665189 | 0.66259544 | | | |
| Pass 11 | 34.0228537 | 51.5228537 | 0.6603449 | | | |
| Pass 12 | 33.6826251 | 51.1826251 | 0.6580871 | Resultant dead band 64.55 to 65.35% using plus or minus 1.0% correction | | |
| Pass 13 | 33.3457989 | 50.8457989 | 0.65582211 | | | |
| Pass 14 | 33.0123409 | 50.5123409 | 0.65355001 | Enters upper deadband here | | |
| Pass 15 | 32.6822175 | 50.1822175 | 0.65127089 | | | |
| Pass 16 | 32.3553953 | 49.8553953 | 0.64898483 | | | |

What is claimed is:

1. A method of controlling operation of a tire filling mixing machine, comprising:
   (a) mixing a polyurethane isocyanate and a catalyst in a first mixer to form a virgin polyurethane;
   (b) grinding cured polyurethane core bits in a grinder;
   (c) mixing the virgin polyurethane and the ground core bits in a second mixer thereby forming a mixed flatproofing material;
   (d) sequentially injecting the mixed flatproofing material into a series of tires;
   (e) at time intervals between the injection of the mixed flatproofing materials into each one of the series of tires:
      (1) measuring a ratio of ground core bits to virgin polyurethane in the mixed flatproofing material by:
         (i) weighing the virgin polyurethane prior to the virgin polyurethane entering the second mixer, and
         (ii) weighing the tire being filled that contains a mixture of virgin polyurethane and ground core bits; and then
         (iii) comparing the measured weight of the tire filled to the measured weight of the virgin polyurethane entering the second mixer, thereby calculating the ratio of ground core bits to virgin polyurethane in the mixed flatproofing material;
      (2) comparing the measured ratio of ground core bits to virgin polyurethane to a pre-stored preferred ratio of ground core bits to virgin polyurethane; and then
      (3) increasing or decreasing relative percentages of virgin polyurethane and ground core bits entering the second mixer by an amount that is a fraction of a difference between the measured ratio and the pre-stored preferred ratio,
         (i) wherein the fraction is between ¼% and 5%, and
         (ii) wherein the increasing or decreasing of the relative percentages of the virgin polyurethane and the ground core bits entering the second mixer is only performed when the measured ratio of ground core bits to virgin polyurethane is within a desired error range.

2. The method of claim 1, wherein the fraction is ½%.

3. The method of claim 1, wherein the ratio of ground core bits to virgin polyurethane in the mixed flatproofing material is measured by scales.

4. The method of claim 1, wherein increasing or decreasing the relative percentages of virgin polyurethane and ground core bits entering the second mixer is performed by increasing or decreasing a speed of an auger in the grinder.

5. The method of claim 4, wherein the speed of the auger is adjusted by ½%.

6. The method of claim 4, further comprising:
recording data into a programmable logic controller, the data comprising:
   (a) the measured ratio and a time at which the measured ratio was taken, and
   (b) the pre-stored preferred ratio, and
   (c) the speed of the auger and a time at which the speed of the auger was measured.

7. The method of claim 6, further comprising:
transmitting the data from the programmable logic controller to a remote system operator.

8. The method of claim 1, wherein the relative percentages of virgin polyurethane and ground core bits entering the second mixer are not increased or decreased if the measured ratio of ground core bits to virgin polyurethane varies from the pre-stored preferred ratio by more than a pre-determined error percentage.

9. The method of claim 8, wherein the pre-determined error percentage is 7%.

* * * * *